United States Patent [19]
Pool

[11] Patent Number: 5,409,649
[45] Date of Patent: Apr. 25, 1995

[54] METHOD OF FORMING FOAM BUNS HAVING NO SKIN ON A SURFACE

[75] Inventor: Jerry S. Pool, High Point, N.C.

[73] Assignee: L&P Property Management Company, Chicago, Ill.

[21] Appl. No.: 918,655

[22] Filed: Jul. 22, 1992

[51] Int. Cl.$^6$ ............................................. B29C 67/22
[52] U.S. Cl. .................................... 264/51; 264/101; 264/237; 425/4 C
[58] Field of Search .................. 264/45.8, 51, 53, 237, 264/54, DIG. 84, 48, 101; 425/4 C

[56] References Cited

U.S. PATENT DOCUMENTS

| | | | |
|---|---|---|---|
| 3,016,575 | 1/1962 | Ebneth. | |
| 3,029,473 | 4/1962 | Greenberg. | |
| 3,061,885 | 11/1962 | Rogers. | |
| 3,086,248 | 4/1963 | Culp. | |
| 3,131,426 | 5/1964 | Legler. | |
| 3,679,783 | 7/1972 | McGarr | 264/54 |
| 3,786,122 | 1/1974 | Berg | 264/DIG. 84 |
| 3,890,414 | 6/1975 | Ricciardi et al.. | |
| 4,093,109 | 6/1978 | Schrader | 264/DIG. 84 |
| 4,102,621 | 7/1978 | Talbert | 264/51 |
| 4,108,585 | 8/1978 | Proksa et al. | 425/89 |
| 4,158,032 | 6/1979 | Boon | 264/51 |
| 4,200,603 | 4/1980 | Raffel et al. | 264/51 |
| 4,275,024 | 6/1982 | Luaces | 264/51 |
| 4,537,912 | 8/1985 | Griswold | 521/53 |
| 5,123,936 | 1/1992 | Stone et al. | 55/10 |
| 5,128,379 | 7/1992 | Stone | 521/50 |
| 5,171,756 | 12/1992 | Ricciardi et al. | 521/55 |

FOREIGN PATENT DOCUMENTS 1465900  3/1977  United Kingdom ....... 264/DIG. 84

Primary Examiner—Allan R. Kuhns
Attorney, Agent, or Firm—Wood, Herron & Evans

[57] ABSTRACT

A method of forming foam buns including the steps of pouring foam in a liquid state onto a fall plate, preventing the forming of skin on upper and lower surfaces of the foam during a creaming state thereof as the foam advances along the fall plate and onto and along a conveyor, removing the formed bun from the conveyor, and causing a cooling gas to be forced through upper and lower surfaces of the bun and through the bun to effectuate rapid cooling of the bun. To prevent a skin from forming on the lower surface the fall plate is insulated to prevent heat transfer from the lower surface to the fall plate and the consequent forming of a skin on the lower surface of the bun which would normally result. To prevent the skin from forming on the upper surface of the bun, sheets of plastic film are applied to the upper surface of the foam and advanced with the foam as the foam advances along the fall plate and onto and along the conveyor preventing loss of blowing agent from the upper surface and preventing air from coming into contact with the upper surface. Subsequently the sheets of film are removed, and porous upper and lower surfaces are revealed through which a cooling gas can readily be forced.

24 Claims, 2 Drawing Sheets

METHOD OF FORMING FOAM BUNS HAVING NO SKIN ON A SURFACE

FIELD OF THE INVENTION

This invention relates generally to the production of polyurethane foam buns, and more particularly to a method of manufacturing polyurethane foam buns which greatly reduces the time between pouring of the liquid foam and the time at which useful articles can be fabricated from the cured foam bun, and which produces uniform mechanical properties through the cross-section of the bun.

BACKGROUND OF THE INVENTION

It is known to form relatively large blocks or "buns" of polyurethane foam, from which many types of useful articles can be constructed. For example, the foam bun can be sliced into smaller pieces, from which can be made seat cushions, mattresses and the like.

Production of these polyurethane foam buns involves the pouring of the foam mixture when in a liquid state from a pour trough onto a fall plate. As the mixture reacts, the foam transitions from a liquid state to a "creaming" state by virtue of a blowing agent which generates thermal expansion of the foam. During this creaming phase, the mixture rises and then subsequently hardens, or sets to form cellular solid foam. The mixture advances along the fall plate and onto and along a mechanically operated endless band conveyor. The block of foam, or bun, is then removed from the conveyor, and is allowed to "set" or "cure" for the proper amount of time to allow the mixture to form the solid cellular foam.

A disadvantage in the conventional production of polymeric foam buns is the amount of time required for a typical foam bun (which would be on the order of 8 feet wide×60 feet long×40 inches tall) to sufficiently cure such that products can be fabricated from the bun. Typically this has required on the order of 48 hours. This is because the interior of the bun can remain at a very high temperature (around 300° F.) for a number of hours, due to the mass of such buns and the excellent heat insulating qualities of the polyurethane foam.

Another disadvantage with conventional foam bun production techniques is that, due to the aforementioned mass and heat insulating qualities of the polyurethane foam buns, the interiors of the bun in cooling at a slower rate than the exterior surfaces of the bun create, when cured, a bun which has mechanical properties which can vary greatly through the cross section of the bun. Specifically, the buns are generally harder in the center and softer on the vertical sides and upper and lower surfaces of the bun.

The ASTM 3574-D test standard for foam contains the Indention Force Deflection ("I.F.D.") test. This test standard measures the amount of force required to press an 8 inch diameter metal disc into the top surface of a test specimen a distance equal to 25% of the thickness of the test specimen. The foam industry has accepted 4 inches as the standard thickness, so the I.F.D. test would be based on a 1 inch indentation. The round disc is outfitted with a load cell or scale to record the force required. Foams are fabricated for multiple uses, and the force from the I.F.D. test can be anywhere from less than one lb. to 100 lbs., depending on the grade of foam and its particular application. A standard value for foam employed in couch cushions, chair cushions and the like would be foam having an I.F.D. on the order of 25–30 lbs. With conventional foam bun production techniques, the I.F.D. spread on 25–30 lb. foam can be as much as 7 lbs. on low density foam and as high as 12 lbs. on high density foam. A spread of that magnitude is particularly undesirable because when couch cushions (typically three for a standard couch) are cut from the same bun, the cushions are noticeably of a different firmness, which can readily be detected when moving from seated atop one cushion to being seated atop another cushion of the couch.

One solution to shortening the curing period for polyurethane foam buns and in the process creating more uniform cross sectional properties of the bun is disclosed in U.S. Pat. No. 3,890,414 to Ricciardi et al for a Rapid Cooling Process For Improving Quality Of Polyurethane Foam. Ricciardi discloses a process for improving the uniformity of the cross-sectional properties of a polyurethane foam bun comprising rapidly and uniformly cooling a bun of hot freshly polymerized foam by passing a large quantity of a cooling gas through the foam mass. Ricciardi discloses that preferably the gas is air that is drawn through the foam by applying a suction to one surface thereof.

However, such a technique as disclosed in Ricciardi has not met with complete success in remedying the aforementioned problems, namely the long cure times and non-uniform cross-sectional properties. Specifically, for the Ricciardi process to be successful, the opposed surfaces of the foam bun through which the cooling gas is drawn or forced, must be sufficiently porous to allow the cooling gas to easily pass through those surfaces and the bun itself. However, in the typical production of polymeric foam buns, a thick skin tends to form on the upper and lower surfaces of the bun during its production. A thick skin forms on the upper surface of the bun due to the fact that air comes into contact with the upper surface causing rapid cooling and loss of blowing agent and consequently the production of a skin thereon. A similar skin forms on the lower surface of the bun as the mixture flows downwardly over and along the fall plate on its way to reaching the conveyor. This is because the heat generated from the reacting mixture, which is traveling over the fall plate, is conducted into the fall plate, which is typically fabricated of steel. The fall plate can reach temperatures as high as 150°–160° F. This heat transfer from reacting mixture to fall plate therefore reduces the temperature of the foam mass at its lower surface and thereby reduces the amount of thermal expansion able to be generated by the blowing agent. This skin is somewhat thinner than the upper skin because of the heat returned to the foaming mixture from the fall plate after the fall plate has reached a temperature of 150°–160° F. This effect of the fall plate upon the foam tends to yield thinner, lighter skins in much the same way that mold temperature controls skin thickness in "internal skin" molding.

To remedy this problem and to allow the Ricciardi technique to work efficiently, Ricciardi teaches removing or puncturing this skin, which is generally densified and substantially nonporous, to allow the cooling gas to flow easily through. Ricciardi states that it is often necessary to completely remove a thin layer, from about ⅛ inch up to about 1 inch, from a pair of opposing surfaces of the foam block to expose a porous surface which will permit the passage of the cooling gas into, through and out of the foam block.

It will be appreciated, however, that such puncturing of the thickened skin, or entirely removing the thickened skin from the foam bun, is laborious and time-consuming. However, this step is required to enable air to be drawn through the bun. Having to perform this step tends to negate the efficiencies of rapidly cooling the foam bun by passing the cooling gas therethrough.

It has therefore been an objective of the present invention to provide an improved method of forming foam buns.

It has been another objective of the present invention to eliminate the need of puncturing or removing the thickened skin of opposing bun surfaces in order that a cooling gas can effectively be passed through the bun to cool and rapidly cure the bun.

It has been yet another objective of the present invention to prevent the forming of the thickened skin on the upper and lower surfaces of a foam bun during production thereof, such that porous upper and lower surfaces will be immediately exposed so that the foam bun can be rapidly cooled by passing a cooling gas through the bun without any other preparatory steps being required.

SUMMARY OF THE INVENTION

In accordance with the stated objectives, the present invention is a method of forming foam buns which comprises the steps of pouring foam in a liquid state onto a fall plate, preventing the forming of skin on upper and lower surfaces of the foam during a creaming state thereof as the foam advances along the fall plate and onto and along a conveyor and forms into a bun, removing the bun from the conveyor, and causing a cooling gas to be forced through upper and lower surfaces of the bun and the bun itself to effectuate rapid cooling of the bun.

More particularly, in the practice of the present invention, a pour trough, a fall plate and a conveyor are provided. The fall plate is insulated. Foam is poured in a liquid state from the trough onto the fall plate, and a sheet of film is applied to the upper surface of the foam. The sheet of film advances with the foam as the foam advances along the fall plate and onto and along the conveyor, and as the foam changes from a liquid state to a creaming state and finally into a bun. Subsequently the sheet of film is removed from the upper surface of the bun, and a cooling gas is caused to be forced through the upper and lower surfaces of the bun and through the bun to effect rapid cooling of the bun.

The fall plate is insulated by placing a foam pad thereatop and covering the pad with a sheet of relatively heavy paper which has a reduced friction upper surface. Such a suitable paper is manufactured by Kraft. Preferably the pad is approximately ¾ of an inch thick.

The film utilized to overlay the upper surface of the foam is preferably plastic film, which is on the order of about 2 mils thick. Preferably the film is placed on the upper surface of the foam within about 12 inches of the pour trough.

It is preferable to remove the film on the upper surface of the foam about 70 feet from the pour trough.

After the sheet of film has been removed, the bun is allowed to cool approximately 40 minutes before causing the cooling gas to be forced through the bun.

In order to force the cooling gas through the bun, it is preferable to place the bun atop a vacuum table such that air can be drawn through the bun from the upper surface downwardly through the bun and outwardly through the lower surface of the bun. Preferably air is drawn through the bun for approximately 9 minutes.

Advantages of the present invention are numerous. By preventing the thick skin from forming on the upper and lower surfaces of the bun, the bun is ready to be placed atop a vacuum table for rapid cooling thereof without any other preparatory steps being required, namely puncturing and/or removing of the thickened skin. Therefore, the maximum benefit in the reduction of curing time by employing forced cooling is realized. And, the rapid cooling brings the mechanical properties of the foam into a much tighter range through the cross section of the bun. Further, the rapid cooling allows a manufacturer to fabricate from foam which was produced the same day, rather than having to wait 48 hours for curing of the bun before fabricating from same. In addition, the amount of blowing agent required to pour the foam is reduced since no blowing agent escapes from the upper surface of the foam, aiding the manufacturer in staying within the permitted levels of methylene chloride and trichloroethane.

These and other objects and advantages of the present invention will become more readily apparent during the following detailed description taken in conjunction with the drawings herein, in which:

DETAILED DESCRIPTION OF THE INVENTION

Figures 1, 1A:
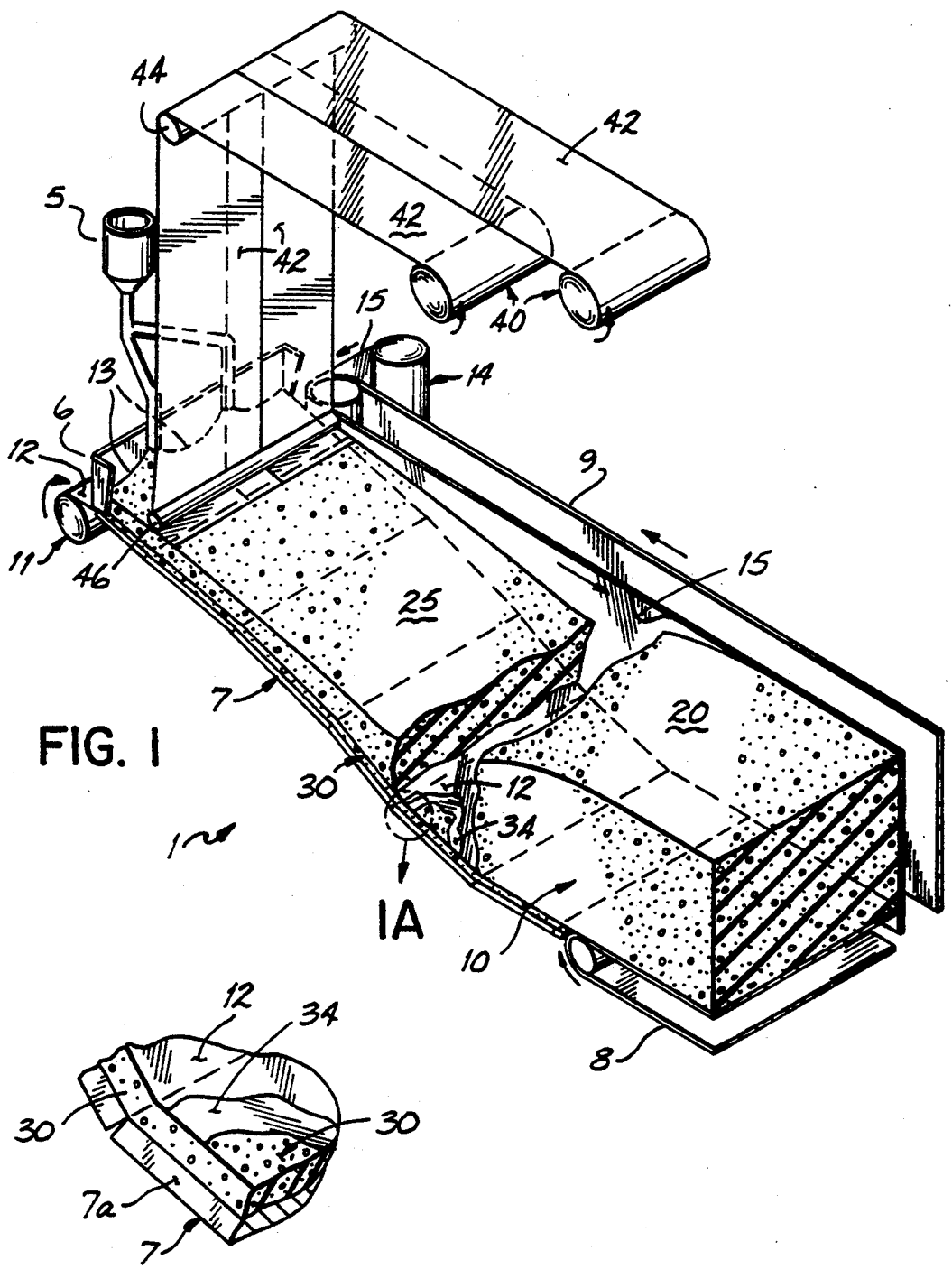
FIG. 1 is a perspective view of a polyurethane foam production line incorporating the aspects of the present invention.
FIG. 1a is a partial sectional view, in perspective, of the insulated fall plate according to the present invention.

Referring first to FIG. 1, there is illustrated a polyurethane foam production line designated generally by the numeral 1. The assembly line 1 includes, generally, a mixture application device 5, a pour trough 6, a fall plate 7 and an endless horizontally oriented belt conveyor 8. A pair of vertically oriented endless belt conveyors 9 (only one of which is shown for clarity purposes) are disposed on either lateral side of the fall plate 7 and conveyor 8. The conveyors 8 and 9 provide traveling side walls and bottom wall for advancing a forming block of urethane foam 10 along the production line 1. A roll of plastic film 11 dispenses a sheet of film 12 atop the fall plate 7 onto which liquid mixture 13 is dispensed. The sheet 12 prevents the mixture 13 from coming directly in contact with the fall plate 7 or endless belt conveyor 8. Similarly, rolls of plastic 14 (only one of which is shown for clarity purposes) are disposed on either lateral side of the fall plate 7 and feed similar sheets 15 of plastic film between the advancing vertically oriented endless conveyors 9 and the mixture 13.

In traditional polyurethane foam bun production processes, a thickened skin forms on the upper 20 and lower 21 surfaces of the bun 10. This is due to air coming in contact with the upper surface 20 of the foam causing rapid cooling of the upper surface and loss of blowing agent therefrom, and the cooling of the lower surface 21 of the forming bun 10 by virtue of heat transfer from the lower surface 21 to the fall plate 7.

As air comes into contact with upper surface 21, blowing agent gases escape therefrom into atmosphere. With a loss of blowing agent there is a reduction in thermal expansion of the mixture. Additionally, air coming into contact with upper surface 21 causes rapid cooling and premature interruption of the thermal expansion process. These phenomena lead to the production of a thickened skin on upper surface 21.

Fall plate 7 is typically fabricated of steel. When the liquid mixture 5 is deposited atop the fall plate 7, the mixture is at a temperature of about 78° to 80° F. As the mixture 13 begins to "cream up", as shown at 25, the temperature of the creaming mixture quickly rises to temperatures in excess of 200° F. The fall plate 7 readily absorbs heat from the creaming mixture 25. After the initial startup of production line 1, and after approximately 1,500 feet of foam has been poured, the fall plate can reach temperatures of up to 150°-160° F. Therefore, it will be appreciated that the heat transfer from lower surface 21 to fall plate 7 in fact cools the lower surface 21 of the creaming mixture 25, thereby inhibiting or prematurely interrupting the thermal expansion process. The result is a thickened skin formed on lower surface 21 similar to the thickened skin formed on the upper surface 20 of the bun 10 due to exposure to air but thinner due to the heat returned to the foam from the fall plate.

In order to prevent heat buildup in the fall plate 7 and loss of heat from lower surface 21 thereto, and hence to avoid the formation of a thickened skin on the lower surface 21 of the foam bun 10, the fall plate 7 is insulated, as shown in FIG. 1a. Referring now to FIG. 1a, there is placed atop the fall plate 7 an insulating foam pad 30, which preferably is approximately ¾ of an inch thick. The lateral edges of the foam pad 30, one of which is shown at 32, are tapered or feathered downwardly to the fall plate 7. Atop the foam pad 30 there is placed a sheet of relatively heavy guage paper 34 which includes on one side thereof a relatively or reduced low coefficient of friction surface, which surface is oriented upwardly. Such a suitable paper 34 is manufactured by Kraft. The pad 30 and paper 34 are secured to the fall plate 7 along the periphery of the fall plate 7 by tape (not shown) which adheres to paper 34, edge 32 of pad 30, and edge 7a of fall plate 7.

In order to prevent loss of blowing agent from and air coming into contact with upper surface 20 and hence to avoid the formation of a thickened skin on the upper surface 20 of the bun 10, a pair of rolls of plastic film 40 dispense a pair of overlapping sheets 42 of film each of which is approximately 2 mils thick, atop the freshly poured mixture 13. A roller 44 transitions the sheets 42 from traveling rearwardly and horizontally to traveling downwardly and vertically, and another roller 46 causes the sheets 42 to transition to traveling forwardly and horizontally and to be applied atop the freshly poured mixture 13. Rolls 40 can be adjusted laterally to accommodate various widths of production lines 1, the only requirement being that the sheets 42 overlap so that there is no exposed area of the upper surface 20 of the foaming bun 10. Further, roller 46 can be made vertically adjustable by means not shown to press sheets 42 into the freshly poured mixture 13. Preferably sheets 42 are applied to the freshly poured mixture 13 within about 12 inches of trough 6.

Figure 2:
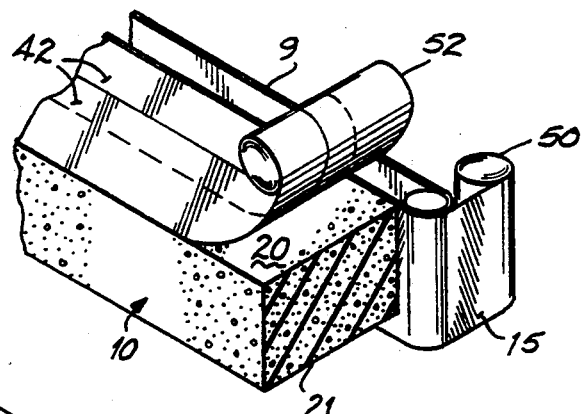
FIG. 2 is a perspective view illustrating the removal of the plastic sheets of film from upper and lateral surfaces of the foam bun.
Figure 3:
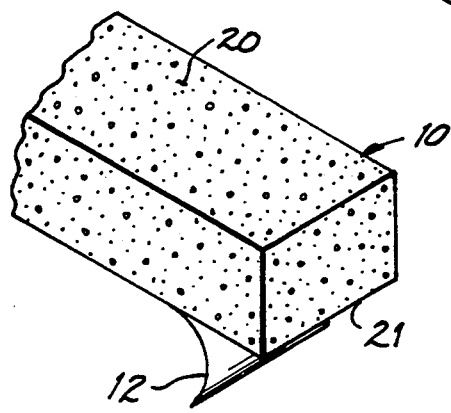
FIG. 3 is a perspective view illustrating the removal of the plastic sheet from the lower surface of the foam bun.

Approximately 70 feet from the pour trough 6, the upper and side sheets of plastic 15 and 42 are removed from the bun 10 via return rolls 50 and 52, respectively, as illustrated in FIG. 2. It has been determined that, at approximately 70 feet from the pour trough 6, the likelihood of a thick skin forming on upper surface 20 of bun 10 is so greatly reduced that the upper sheets 42 may then safely be removed without the threat of a thickened skin forming remaining. The sheet of plastic film 12 applied to the lower surface 21 of the bun 10 is manually stripped away as illustrated in FIG. 3 approximately 20 minutes after the foam is poured from the trough 6.

Subsequent to forming, and prior to the yet to be described rapid cooling step, the bun is allowed to cure for approximately 40 minutes to allow sufficient time for physical properties to develop before the rapid cooling process begins.

Figure 4:
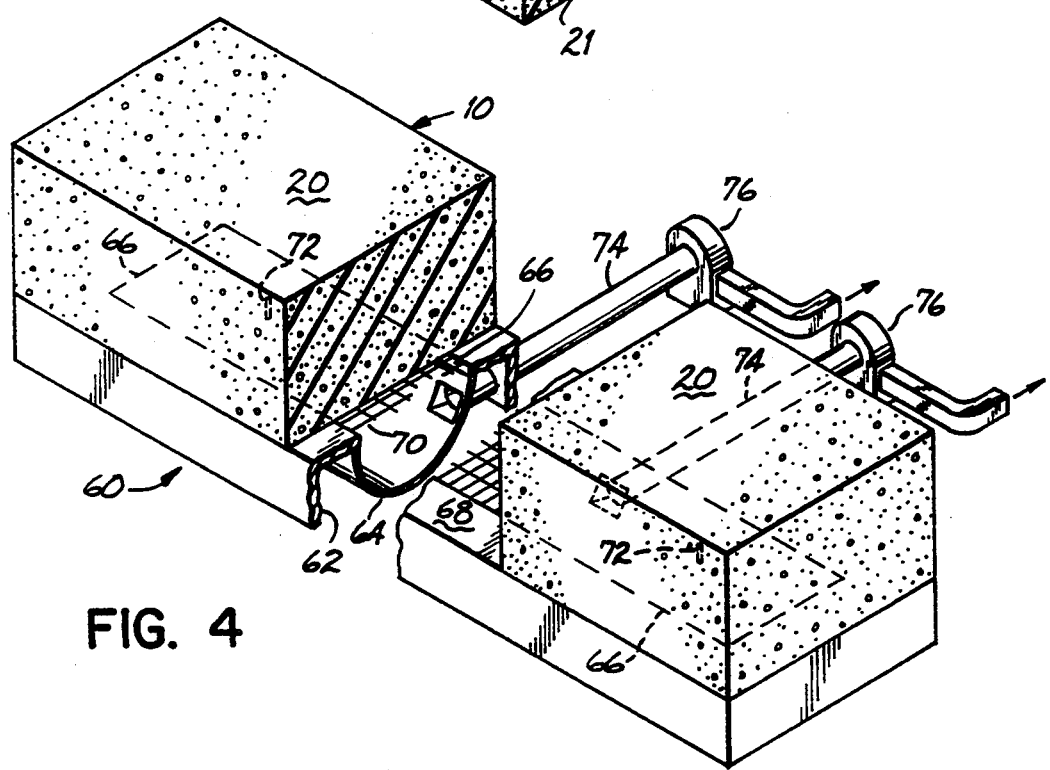
FIG. 4 is a perspective view illustrating the vacuum cooling step according to the present invention.

Referring now to FIG. 4, the rapid cooling step is illustrated. Bun 10 is placed atop a vacuum table 60. The table 60 is approximately 8 feet wide×60 feet long×24 inches tall and includes a support structure 62 underneath which is attached a half cylindrical sheet metal duct or plenum 64. An opening 66 in the tabletop 68 of the table 60 is covered with wire mesh 70. Four temperature probes, two of which are shown at 72, are oriented such that when bun 10 is placed atop tabletop 68 the probes penetrate the bottom surface 21 of bun 10, and preferably penetrate to a depth of approximately 4 inches, to monitor the temperature of the bun. Ducts 74 connect the half cylindrical table duct 64 with a pair of exhaust fans 76 each of which is rated at 25 horsepower and generates 7,000 cubic feet per minute at a 13.5 inch water column. The bun 10 is rapidly cooled on the cooling table 60 terminating the cooling process, typically for approximately 9 minutes. During this time, the interior temperature of the bun 10 drops from about 300° F. to about 150° F., at which time the bun can be fabricated into chair cushions, couch cushions and the like. Thus, a manufacturer can fabricate from the bun 10 manufactured according to the practice of the present invention the same day, and ordinarily within about 2 hours of pour, rather than having to wait up to 48 hours as with conventional techniques.

Results from tests performed on buns fabricated according to the practice of the present invention were found to be superior in terms of uniformity of mechanical properties through the cross-section of the bun. Specifically, I.F.D. tests performed on these buns yielded I.F.D. spreads of only about 1.5–2.5 lbs. on 25–30 lb. foam, whereas conventional bun production techniques yield I.F.D. spreads of about 7.0 lbs. on 25–30 lb. foam.

Those skilled in the art will readily recognize numerous adaptations and modifications which can be made to the present invention which will result in an improved method of forming foam buns without departing from the spirit or scope of the present invention, as all of which will come within the scope of the appended claims and their equivalents. Accordingly, the invention is to be limited only by the following claims and their equivalents.

What is claimed is:

1. A method of forming foam buns comprising the steps of:

providing a pour trough, a fall plate and a conveyor;

insulating the fall plate to inhibit heat transfer from foam atop the fall plate to the fall plate;

pouring foam in a liquid state from the trough onto the fall plate;

applying a sheet of film to an upper surface of the foam;

advancing the sheet of film with the foam as the foam advances along the fall plate and onto and along the conveyor as the foam changes from a liquid state to a creaming state and finally into a bun;

removing the sheet of film from the bun; and causing a cooling gas to be forced through upper and lower surfaces of the bun and through the bun to effectuate rapid cooling of the bun.

2. The method of claim 1 wherein the film is plastic film.

3. The method of claim 2 wherein the film is about 2 mils thick.

4. The method of claim 1 wherein the film is placed the upper surface of the foam within about 12 inches of the pour trough.

5. The method of claim 1 wherein the film on the upper surface of the foam is removed about 70 feet from the pour trough.

6. The method of claim 1 wherein the bun is allowed to cool approximately 40 minutes before causing the cooling gas to be forced through the bun.

7. The method of claim 1 wherein the forcing of cooling gas through the bun is accomplished by placing the bun atop a vacuum table and drawing air through the bun.

8. The method of claim 7 wherein the forcing of cooling gas through the bun is continued for approximately 9 minutes.

9. A method of forming foam buns comprising the steps of:

providing a pour trough, a fall plate and a conveyor;

insulating the fall plate;

pouring foam in a liquid state from the trough onto the fall plate;

applying a sheet of film to an upper surface of the foam;

advancing the sheet of film with the foam as the foam advances along the fall plate and onto and along the conveyor as the foam changes from a liquid state to a creaming state and finally into a bun;

removing the sheet of film from the bun; and causing a cooling gas to be forced through upper and lower surfaces of the bun and through the bun to effectute rapid cooling of the bun;

the fall plate being insulated by placing a foam pad thereatop.

10. The method of claim 9 wherein the pad is about $\frac{3}{4}$ inch thick.

11. A method of preventing the forming of skin on upper and lower surfaces of a foam bun during production thereof comprising the steps of:

providing a pour trough, a fall plate and a conveyor;

insulating the fall plate to inhibit heat transfer from foam atop the fall plate to the fall plate;

pouring foam in a liquid state from the trough onto the fall plate;

applying a sheet of film to an upper surface of the foam;

advancing the sheet of film with the foam as the foam advances along the fall plate and onto and along the conveyor as the foam changes from a liquid state to a creaming state and finally into a bun; and removing the sheet of film from the bun.

12. The method of claim 11 wherein the film is plastic film.

13. The method of claim 12 wherein the film is about 2 mils thick.

14. The method of claim 11 wherein the film is placed on the upper surface of the foam within about 12 inches of the pour trough.

15. The method of claim 11 wherein the film on the upper surface of the foam is removed about 70 feet from the pour trough.

16. A method of preventing the forming of skin on upper and lower surfaces of a foam bun during production thereof comprising the steps of:

providing a pour trough, a fall plate and a conveyor;

insulating the fall plate;

pouring foam in a liquid state from the trough onto the fall plate;

applying a sheet of film to an upper surface of the foam;

advancing the sheet of film with the foam as the foam advances along the fall plate and onto and along the conveyor as the foam changes from a liquid state to a creaming state and finally into a bun; and removing the sheet of film from the bun;

the fall plate being insulated by placing a foam pad thereatop.

17. The method of claim 16 wherein the pad is about $\frac{3}{4}$ inch thick.

18. A method of forming foam buns comprising the steps of:

providing a pour trough, a fall plate and a conveyor;

providing a layer of insulation over the fall plate to inhibit heat transfer from foam atop the fall plate to the fall plate;

advancing a sheet of material over the insulation atop the fall plate;

pouring foam in a liquid state from the trough onto the sheet of material while the sheet of material is supported by the fall plate; and advancing the foam while supported on its sheet of material along the fall plate and the conveyor as the foam changes from a liquid state to a creaming state and finally into a bun;

the layer of insulation atop the fall plate being sufficiently insulative as to reduce the tendency of a nonporous skin to form on the lower surface of the bun as the foam moves over the fall plate.

19. The method of claim 18 wherein the fall plate is insulated by placing a foam pad thereatop.

20. The method of claim 19 wherein the pad is about $\frac{3}{4}$ inch thick.

21. The method of claim 19 wherein the foam pad is overlayed with a sheet of relatively heavy paper having a reduced friction upper surface.

22. The method of claim 18 further comprising the step of:

causing a cooling gas to be forced through upper and lower surfaces of the bun and through the bun to effectuate rapid cooling of the bun.

23. A method of preventing the forming of skin on an upper surface of a foam bun during production thereof comprising the steps of:

providing a pour trough, a fall plate and a conveyor;

pouring foam in a liquid state from the trough onto the fall plate;

applying a sheet of film to an upper surface of the foam as the foam changes from a liquid state to a creaming state and prior to formation of a thickened skin on the upper surface of the foam;

advancing the sheet of film with the foam as the foam advances along the fall plate and onto and along the conveyor as the foam changes from a liquid state to a creaming state and finally into a bun, said sheet preventing rapid cooling of and loss of blowing agent from the upper surface of the foam; and removing the sheet of film from the bun after substantial thermal expansion of the bun and little likelihood of formation of a thickened skin on the upper surface of the bun remains;

wherein the film is placed on the upper surface of the foam within about 12 inches of the pour trough.

24. A method of preventing the forming of skin on an upper surface of a foam bun during production thereof comprising the steps of:

providing a pour trough, a fall plate and a conveyor;

pouring foam in a liquid state from the trough onto the fall plate;

applying a sheet of film to an upper surface of the foam as the foam changes from a liquid stage to a creaming state and prior to formation of a thickened skin on the upper surface of the foam;

advancing the sheet of film with the foam as the foam advances along the fall plate and onto and along the conveyor as the foam changes from a liquid state to a creaming state and finally into a bun, said sheet preventing rapid cooling of and loss of blowing agent from the upper surface of the foam; and removing the sheet of film from the bun after substantial thermal expansion of the bun and little likelihood of formation of a thickened skin on the upper surface of the bun remains;

wherein the film on the upper surface of the foam is removed about 70 feet from the pour trough.

* * * * *